United States Patent [19]

Dagard et al.

[11] Patent Number: 4,675,090
[45] Date of Patent: Jun. 23, 1987

[54] PROCESS FOR EXTRACTING AN ACID, MORE ESPECIALLY BORIC ACID, FROM A WEAKLY IONIZED AQUEOUS SOLUTION

[75] Inventors: Philippe Dagard, Marly Le Roi; Thierry V. Cohen, Paris, both of France

[73] Assignee: Framatome & Cie., Courbevoie, France

[21] Appl. No.: 790,018

[22] Filed: Oct. 22, 1985

[30] Foreign Application Priority Data

Oct. 23, 1984 [FR] France ................ 84 16194

[51] Int. Cl.$^4$ .............. C25B 7/00; C25D 13/00; B01D 57/02
[52] U.S. Cl. ..................... 204/182.3; 204/182.4; 204/301
[58] Field of Search .............. 204/182.3, 182.4

[56] References Cited

U.S. PATENT DOCUMENTS 4,148,708  4/1979  Grant .................. 204/301
4,246,092  1/1981  Perry et al. ............ 204/301

FOREIGN PATENT DOCUMENTS 0085611 10/1983 European Pat. Off. .
1248743 11/1960 France .

OTHER PUBLICATIONS

Purin, Chem. Abstracts 90 (1979) #57229u.

Primary Examiner—Arthur P. Demers
Attorney, Agent, or Firm—Pollock, Vande Sande & Priddy

[57] ABSTRACT

The concentration of an acid in a weakly ionized aqueous solution, more particularly the concentration of boric acid in solution in demineralized water from the primary circuit of a pressurized water nuclear reactor, is modified by effecting simultaneously the dissociation of the acid and the electrodialysis of the solution using at least one electrodialysis membrane comprising a polymer support such as PTFE or FEP and having aminated groups introduced for example according to a process comprising a step of grafting.

11 Claims, 1 Drawing Figure

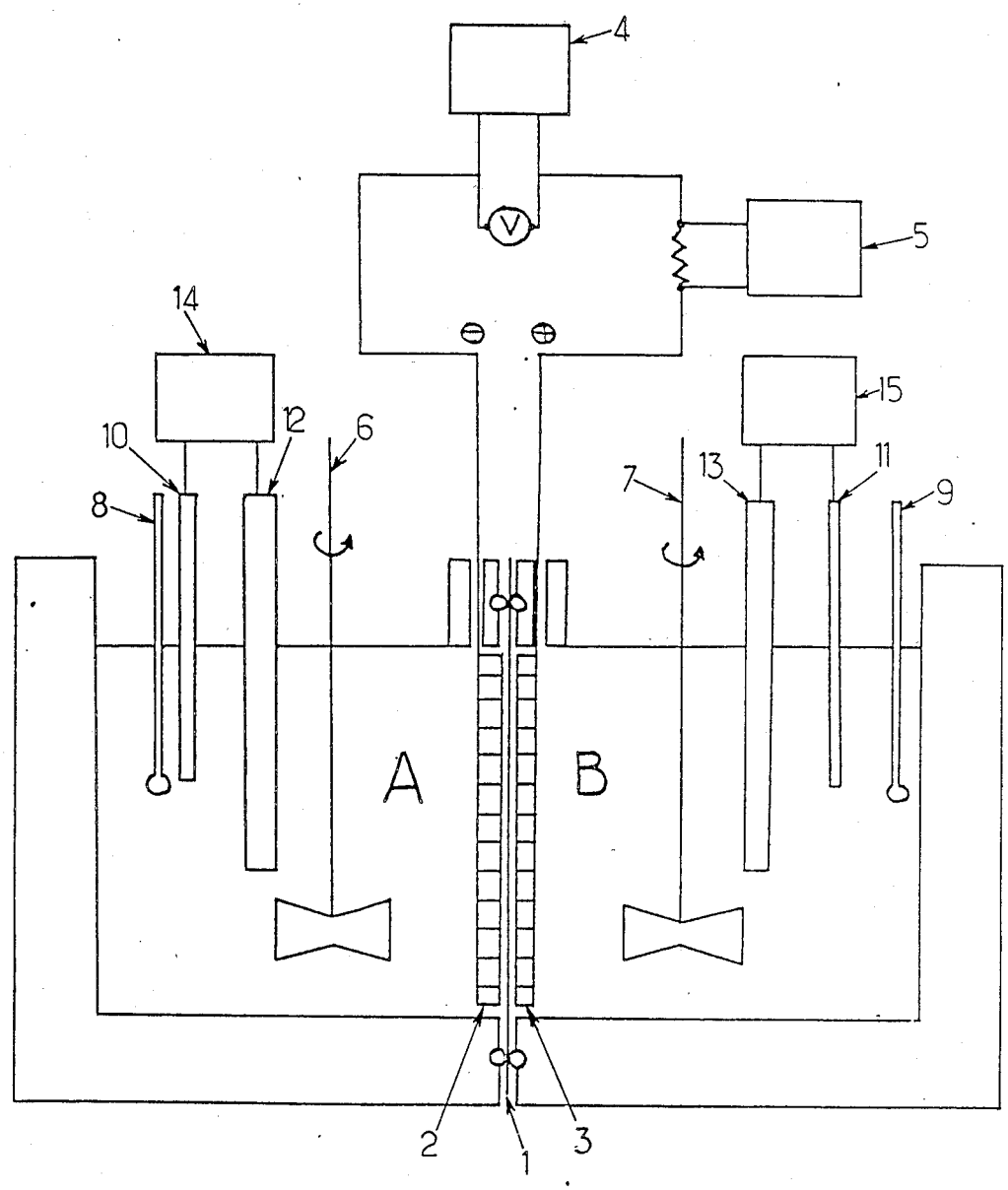

PROCESS FOR EXTRACTING AN ACID, MORE ESPECIALLY BORIC ACID, FROM A WEAKLY IONIZED AQUEOUS SOLUTION

The invention relates to the modification by electrodialysis of the concentration of an acid in a weakly ionized aqueous solution, and more particularly to extraction thereof from this solution, and it finds an important application in the treatment of the boric acid charged water forming the refrigerant and moderator of a nuclear reactor.

The acid in question may, besides boric acid, be any weak organic or mineral acid, or else an amphoteric aminated acid.

It is known that pressurized water nuclear reactors known under the name "PWR" use a refrigerant demineralized water to which are added lithium hydroxide or lithine, which maintains a basic pH so as to avoid corrosion of the nickel steels in contact with the refrigerant, and boric acid bringing boron which plays the role of neutron absorber. By adjusting the boric acid content of the water, the neutron flow may be regulated and the operation thereof modified. The adjustment is effected by removing or adding boric acid.

A solution currently used at the present time for modifying the acid concentration of an aqueous solution consists in using an electrodialyser having a stack of cation or anion exchanging membranes, depending on the case, through which the acid solution to be treated is caused to flow. The anionic membranes comprise functional groups, aminated ($-NR_3^+$) for example, allowing anions to pass and preventing cations from passing. Conversely, the cationic membranes comprise functional groups, $-SO_3^-$ for example, allowing cations to pass and stopping anions.

The adjustment by electrodialysis of the concentration of boric acid—or of any other weak acid—in a dilute solution, for example at about 500 ppm (parts per million) of acid in the deionized water, and more particularly the removal of this acid from the solution meets the problem of the weak ionization of the solution due to the low dissociation of the acid, in particular $H_3BO_3$.

It has already been proposed, in patent application No. EP 0 085 611 of the firm Framatome et Cie to which reference may be made for further details concerning the problem raised in the particular case of "PWR" nuclear reactors, to add to the refrigerant fluid, at the outlet of the primary circuit, an additive intended for promoting dissociation of the boric acid. However, the different "additives" proposed for promoting this dissociation have a number of drawbacks such more especially as an additional space requirement and risks of pollution because of considerable leaks.

The invention aims then at overcoming these drawbacks by proposing a process for electrodialysing a weakly ionized acid aqueous solution in which dissociation of the acid is promoted within one at least of the electrodialysis membranes themselves.

More precisely, the invention generally relates to a process for modifying the concentration of an acid in a weakly ionized solution, and more especially for removal thereof from this solution, characterized in that it consists in simultaneously carrying out the dissociation of the acid and the electrodialysis of the solution by means of at least one electrodialysis membrane comprising a polymer support compatible with the solution and having aminated groups.

It has in fact been discovered surprisingly, contrary to the ion exchanging membranes used up to the present in water electrodialysers and which, comprising non specific ionic radicals, are not capable of dissociating a weak acid such as boric acid in a weakly ionized solution, that a membrane comprising aminated group presents, with respect to weak acids and more especially boric acid, this specificity.

It is desirable for such a membrane to be substantially impermeable to $H^+$ and $OH^-$ ions.

The support membranes used in accordance with the invention must have good mechanical strength, if it is desired to avoid using a support grid. But the thickness must remain as small as possible so as to accelerate the kinetics of the membrane transports by chemical extraction and for reducing the value of the electric field required by electrolytic migration. In practice it is desirable to use a support whose thickness is between about 25 and a few hundred microns. In addition, the films must have an excellent homogeneity so as to ensure uniform distribution of the aminated groups.

The polymer support may be formed, among others, from different known polyethylenes and polyesters. In the more particular case of the treatment of boric acid charged water coming from the primary circuit of a "PWR" nuclear reactor, the support is advantageously formed from a perfluorated polymer, that is to say more especially a film or tissue of a poly(tetrafluorethylene) called PTFE or a fluoroethylene-propylene polymer called FEP, manufactured by the firm DU PONT DE NEMOURS and having a thickness of a few tens of microns, fifty microns on average.

Advantageously, the aminated membrane used in accordance with the invention is obtained by means of a process comprising a step for grafting, more especially radio chemically, of a compound capable, because of its structure, of being grafted to the chosen support.

In the simplest case, an aminated compound such as vinyl-4-pyridine may be grafted directly.

More generally, the grafted compound comprises a site which, after grafting, will be capable of reacting with an amine, for example a halogen-alkyl group, more particularly chloromethyl. By way of example, as compound of this type chloromethylstyrene may be mentioned.

In this case, the next step in preparing the membrane consists in an amination reaction on the reactive site, for example the chloromethyl group.

In a variant, it is also possible to proceed in several steps, for example first of all grafting a substance not having any site capable of reacting with an amine, then introducing such a site and finally effecting the amination.

By way of indication, it is possible for example to graft styrene on the base polymer, then to cause the grafted product to undergo halogenomethylation and finally to effect the amination of the halogenomethylated product.

The preparation of aminated fluorated membranes of the above mentioned type is described in greater detail, more particularly in French patent No. FR 1 248 743.

It should be noted that this patent proposes the membranes so obtained for eliminating heavy metals, more especially by electrodialysis, from solutions containing high concentrations of ions such as sodium ions, i.e. strongly ionized solutions.

It does not at all suggest that such membranes could be used for efficiently treating weakly ionized solutions, in particular solutions of weak acids such as boric acid.

The choice of the amine depends to a great extent on the acid to be treated and on the desired selectively with respect to this acid.

Thus the amine may be a "simple" primary, secondary or tertiary amine only comprising alkyl groups, more especially methyl and ethyl.

It may also be cyclic, for example of the pyridine or piperidine type or else have a "complexing" power with respect to the acid to be treated because of the presence for example of a polyalcohol group such as N-methylglucamine.

In an advantageous embodiment of the invention, the above described membrane is further reticulated so as to increase the mechanical resistance thereof and selectivity with respect to the weak acid, particularly boric acid.

This reticulation may be effected at the same time as the grafting, or alternately after the amination step, by causing the aminated membrane to swell in the reticulating agent and by gain irradiating.

Whatever the method of reticulation envisaged, the reticulating agent may be chosen from the bifunctional compounds compatible with the membrane, such as the methacrylates or divinylbenzene, and the reticulation takes place in the presence of a hydroquinone type stabilizer.

The compounds thus obtained are new and come within the scope of the present invention.

In a preferred embodiment, during the electrodialysis, the electrodes are applied against the membrane, on each side thereof.

It goes without saying that the process of the invention is quite particularly applicable to the extraction of the weak acid, more especially boric acid, from a weakly ionized solution, but could also be used for enriching a solution with such an acid, by reversing the direction of the current.

This process may be more especially applied, in the field of biotechnologies, to the continuous elimination of aminated acids from enzymatic or bacterial reactors.

Its essential application seems however to reside in the treatment of the water, charged with boric acid, of the primary circuit of a pressurized water nuclear reactor.

The invention therefore provides in particular a process for modifying the concentration of the boric acid in a weakly ionized solution, and more particularly for extraction thereof, characterized in that it consists in simultaneously carrying out the dissociation of the boric acid and the electrodialysis of the solution by means of at least one electrodialysis membrane comprising a support with a perfluorated polymer basis, preferably with a PTFE or FEP basis, and having aminated groups.

In any case, the process of the invention allows the dissociation of an acid in a weakly ionized solution and the electrodialysis of this solution to be carried out simultaneously without addition of a base, thus avoiding the introduction of alkaline cations.

Some examples of preparing membranes usable in accordance with the invention and examples of using these membranes will be given hereinafter.

Generally, the chosen support must first of all be prepared by washing with a solvent such as methanol or toluene, then dried in vacuum.

The monomer may be used as it is if it is pure, but a commercial product will generally be used which contains stabilizers, particularly, tertiobutylcatechol and nitromethane for the chloromethylstyrene. These products must be removed. For example, distillation is not sufficient for these stabilizers pass at the same time as the monomer. The separation may on the other hand be effected by basic washing followed by drying on sodium sulphate then redistillation.

The film is then placed in the presence of the monomer then of a solvent. The coated pellicule is subjected to radio chemical grafting, for example by exposing it to the gamma rays coming from a $Co^{60}$ source so as to cause polymerization on the chains of the support. The solvent reduces the viscosity of the monomer and optimizes the polymerization mechanism with grafting on the support material.

The grafting rate obtained depends more particularly on three factors:
  monomer/solvent concentration: the higher the concentration, the higher the number of radicals and so the more intense the reaction. This effect will lead to using as low a solvent content as possible, compatible with the acceptable viscosity for the medium;
  temperature of the medium: the grafting rate depends on the speed of diffusion of the monomer in the support which varies in the same way as the temperature;
  irradiation time: the polymerization rate increases with time. On the other hand, an increase in the intensity of irradiation scarcely modifies the grafting rate but only the polymerization speed, so the grafting speed.

As high a grafting rate as possible is desirable. But it is limited to a value of about 80% by the requirement of maintaining the homogeneity of the film.

The amination technique is relatively simple: it involves swelling of the membrane, diffusion and the reaction properly speaking. It will be advantageous to use amination in accordance with Hoffman's reaction (reaction of an amine with a halogenoalkylated compound).

The swelling is effected by means of a solvent, usually dimethylformamide. The grafted film is washed for a long time in toluene, then dried in vacuum. The film is left to swell in dimethylformamide until a balance threshold is reached. It is possible to check the balance is reached by weighing the film or by titration.

Titration is conventionally carried out by placing a membrane in a crystallizer in contact with an acid, for example $H_3BO_3$. After contacting for a given time, the solution is collected which is dosed with a base.

The exchange capacity is the ratio of the number of acid moles fixed on the membrane to the total number of acid moles introduced at the beginning of the reaction.

EXAMPLES OF PREPARING MEMBRANES

Different examples of preparing membranes usable in accordance with the invention will be given hereafter purely by way of illustration and in no wise limitative, the application to FEP or PTFE membranes being extendable to supports such as different polyethylenes and polyesters, depending on the type of application contemplated.

I. GRAFTING

Example 1

Grafting of styrene on FEP of 50 μm at an intensity of 16.5 rad.min$^{-1}$ and at a temperature of 20° C.

The styrene was distilled and kept cold and was used as such, without additional solvent. The results are shown in the table below.

| Appearance of the film | Duration (hours) | Po | Po | $\frac{P - Po}{Po} \times 100\%$ |
|---|---|---|---|---|
| Homogeneous | 80 h 12 min | 0.0456 | 0.077 | 68.8% |
| Homogeneous | 89 h 56 min | 0.0350 | 0.066 | 88.7% |
| Homogeneous | 98 h 18 min | 0.0301 | 0.0641 | 112.9% |

Other tests were carried out at a higher temperature, close to 50° C. and gave the following results.

| Appearance of the film | Duration (hours) | Po | Po | $\frac{P - Po}{Po} \times 100\%$ |
|---|---|---|---|---|
| Homogeneous | 18 h 37 min | 0.0450 | 0.0666 | 48 |
| Homogeneous | 24 h 14 min | 0.0545 | 0.095 | 74.3% |
| Homogeneous | 29 h 26 min | 0.0435 | 0.084 | 93% |

It can be seen that the temperature does not increase the grafting rate but increases the grafting speed.

Example 2

Grafting of chloromethylstyrene on FEP of 50 μm at an intensity of 16.5 rad.min$^{-1}$ and at a temperature of 50° C.

The chloromethylstyrene has as formula:

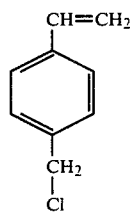

To reduce the viscosity so as to permit better grafting, benzene was added as a solvent in a proportion of 10% by weight.

| Appearance of the film | Duration (hours) | Po | P | $\frac{P - Po}{Po} \times 100\%$ |
|---|---|---|---|---|
| Homogeneous | 48 h 37 min | 0.0190 | 0.0225 | 18.4% |
| Homogeneous | 95 h 42 min | 0.0228 | 0.0352 | 54.6% |

Maximum grafting rate obtained: 69.8%

Example 3

Grafting a 50:50 p/p mixture of styrene and chloromethylstyrene on PTFE of 100 μm at an intensity of 16.6 rad.min$^{-1}$ and at a temperature of 50° C., the styrene serving at the same time as solvent.

| Appearance of the film | Duration (hours) | Po | P | $\frac{P - Po}{Po} \times 100\%$ |
|---|---|---|---|---|
| Homogeneous | 47 h 36 min | 0.0464 | 0.0552 | 19% |
| Homogeneous | 64 h 42 min | 0.0427 | 0.0664 | 32.1% |

Example 4

Grafting of pure chloromethylstyrene on FEP of 50 μm at an intensity of 16.5 rad.min$^{-1}$ and at a temperature of 50° C.

| Appearance of the film | Duration (hours) | Po | P | $\frac{P - Po}{Po} \times 100\%$ |
|---|---|---|---|---|
| Homogeneous | 47 h 18 min | 0.0131 | 0.0344 | 9.9% |
| Homogeneous (viscous solution on film) | 73 h 55 min | 0.0304 | 0.0395 | 30.1% |
| Homogenous (viscous solution on film) | 95 h 45 min | 0.0303 | 0.0455 | 50.2% |

Maximum grafting rate: 50.2%.

The variations of the grfting rate show the importance of the solvent. The presence of the solvent increases in particular, in the examples given, the grafting speed about from 10 to 18% and the grafting rate from 50 to 70%.

Example 5

Grafting vinyl-4-pyridine:

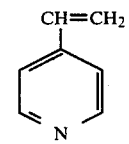

in an alcohol used as solvent, on an FEP film of 50 μm, at a variable intensity and at a temperature of 20° C.

The solvent used is methanol in a proportion of 20% by weight in the solution.

| Appearance of the film | Intensity (rad. min$^{-1}$) | Duration (hours) | Po | P | $\frac{P - Po}{Po} \times 100\%$ |
|---|---|---|---|---|---|
| Homogeneous | 16 | 64 h 45 min | 0.0345 | 0.0349 | 1.2% |
| Homogeneous | 28 | 69 h 54 min | 0.0458 | 0.0925 | 102% |
| Homogeneous | 140 | 33 h 10 min | 0.0502 | 0.01526 | 204% |

This aminated product may be used as a membrane in the process of the invention without any other chemical transformation.

These values and an examination of the experimental curves obtained during numerous tests, some of which only are given above, confirm the increase in the grafting speed when the irradiation intensity increases.

The grafting speed may be estimated, for a constant value of the grafting rate equal to 100%, at 30 hours for 140 rad/min
60 hours for 28 rad/min
70 hours for 22 rad/min -continued

| 90 hours for | 16 rad/min. |
|---|---|

II. AMINATION

The halogenomethylated, particularly chloromethylated, grafted polymers obtained directly by grafting or by subsequent halogenomethylation, were then aminated.

The membranes grafted with chloromethylstyrene were washed for 24 hours in toluene. Then the membranes were left to swell in dimethylformamide (DMF) for 3 hours and were left to aminate for 24 hours.

The yield of the amination reaction was determined for each membrane, i.e. the ratio of the number of moles of substituted amine to the number of moles of chloromethylstyrene.

Example 6

Amination of the grafted polymer of example 2 with dilute trimethylamine (TMA).

The reaction was carried out at ambient temperature because the effect of the temperature is small on such an amine.

The grafted film was immersed in a solvent for facilitating penetration of the amine into the medium.

An adequate solvent may be dimethylformamide.

After washing, the "swollen" film was immersed in trimethylamine which had to not comprise impurities, but could be diluted with 25% of water, until the desired diffusion rate was obtained.

For increasing the penetration of the amine into the membrane, it is possible to use this dilute TMA in a solvent of the same polarity as the preceding one; the simplest thing is to reuse dimethylformamide.

The reaction brought into play may be represented by:

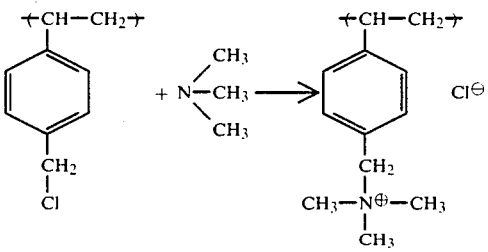

(the signs in a circle indicate polar links).

It can be seen that the higher the chloromethylstyrene content, the more amine is fixed. Equilibrium of the reaction is reached after 24 hours.

After this operation and after washing with water and drying, the initial neutral support membrane has aminated functional sites capable of reacting with dilute boric acid.

Example 7

Amination, using a secondary amine, of a FEP polymer grafted to 60% with a chloromethylstyrene/benzene mixture (90/10): obtaining the membrane $19\frac{1}{2}$ of table I The amine used was diethylamine. The yield of the amination reaction was 41% (mole of amine per mole of chloromethylstyrene).

The number of amine milliequivalents per gram of film was 0.94.

Other membranes have been synthesized; all the amination yield results are given in table I hereafter.

TABLE I

| Code no | Initial mixture | Irradiation time (at 16.5 rad/min) | Chloromethylstyrene content of membrane (%) | Amine used | Yield in moles of amine/moles of chloromethylstyrene | Number of meq of amine/g of dry film |
|---|---|---|---|---|---|---|
| $19_2^1$ | 90 chloromethylstyrene 10 benzene | 155 h 25 min | 37.5 | pure diethylamine | 41% | 0.94 |
| $19_2^2$ | 90 chloromethylstyrene 10 benzene | 155 h 25 min | 37.5 | pure diethylamine | 47% | 1.07 |
| $19_2^3$ | 90 chloromethylstyrene 10 benzene | 155 h 25 min | 37.5 | ethylamine in a 33% aqueous sol. | 60% | 1.35 |
| $19_2^4$ | 90 chloromethylstyrene 10 benzene | 155 h 25 min | 37.5 | methylamine in a 40% aqueous sol. | 70% | 1.64 |
| $19_3^1$ | 90 chloromethylstyrene 10 benzene | 172 h 30 min | 38.6 | ethylamine in a 33% aqueous sol. | 45% | 1.08 |
| $19_3^2$ | 90 chloromethylstyrene 10 benzene | 172 h 30 min | 39 | pure diethylamine | 64% | 1.46 |
| $19_3^3$ | 90 chloromethylstyrene 10 benzene | 172 h 30 min | 39.4 | trimethylamine in a 25% aqueous sol. | 99.5% | 2.2 |
| $19_3^4$ | 90 chloromethylstyrene 10 benzene | 172 h 30 min | 39.4 | methylamine in a 40% aqueous sol. | 38% | 0.94 |

The membranes aminated by amines in aqueous solution were first of all swollen in DMF then treated with a 70% amine and 30% DMF mixture for facilitating penetration of the amine inside the films.

Amination with pure diethylamine was carried out in accordance with the conventional operating mode, after swelling in DMF.

These results show that the amination reaction using this method works well with tertiary amines, less well with secondary amines and not at all well with primary amines.

Another method of amination has therefore been used.

The new amination method was conducted in a reactor over which was mounted a refrigerator and which was provided with a bromine ampoule for introducing the reagents. The membrane was placed about a float serving for limiting the amount of reagents and which also allowed the membrane to be rotated.

Example 8

Amination using a primary amine of a polymer grafted at 37.1% with a chloromethylstyrene/benzene mixture (90/10): obtaining the membrane 19'1/5 of table II hereafter The grafted membrane was left to swell for three hours at ambient temperature in DMF so as to reach equilibrium. Then 50 cm$^3$ of methylamine in a 40% aqueous solution with 3 cm$^3$ of pyridine were slowly added over about 30 minutes, the pyridine serving for increasing the amination yield. The whole was abandoned at 38° C. for four hours. The solution was regularly stirred every 20 minutes. After 4 hours, the membrane was taken out of the reactor and placed in a crystalizer containing a 100 g/l soda solution and was kept at 38° C. for 24 hours (the soda served for giving the membrane, first in the form $$-\overset{|}{\underset{|}{N^+}}-Cl^-,$$

the form $$-\overset{|}{\underset{|}{N^+}}-, OH^-$$

if the amine was tertiary and the form $$-\overset{|}{\underset{|}{N}}-$$

if the amine was secondary or primary).

The next day, the membrane was washed several times in water.

The yield of the amination reaction was 94.8% (amine mole per chloromethylstyrene mole). The number of amine milliequivalants per g of film was 2.14.

Example 9

Amination using a secondary amine of the grafted polymer used in example 8: obtaining the membrane 19'3/6 of table II The amine was diethylamine. The operating conditions were those of example 8.

The yield of the amination reaction was 98.5% (amine mole per chloromethylstyrene mole).

The number of amine milliequivalents per g of film was 2.03.

It can be seen that this new method of amination gives a considerably increased amination yield.

Example 10

Amination using a complexing amine, particularly for boric acid: obtaining the membrane 19'1/6 of table II The complexing amine was N-methylglucamine or 1-deoxy-1-(methylamine)-D glucitol. The choice of this amine was based on the fact that boric acid, in particular, gives complexes with polyalcohols. It may then be thought that the grafted membrane of N-methylglucamine would show a good specificity for boric acid.

The mechanism of the synthesis reaction is the following:

[chemical scheme: chloromethylated membrane + N-methylglucamine → grafted product + HCl]

This membrane may be considered as polyfunctional. In fact, it has a tertiary amine group capable of fixing a proton in an acid medium and thus becoming an anion exchanger and, furthermore, on the nitrogen atom is fixed a sorbitol radical which does not have anion exchanging properties but which is capable of forming stable complexes with boric acid, leading to a greater liberation of protons from boric acid.

Operating mode

The same equipment was used as above. 500 cm$^3$ of DMSO were placed in the reator for 3 hours at 38° C. then 20 g of N-methylglucamine + 1 cm$^3$ of pyridine were added over 24 hours at 38° C.

The next day the membrane was washed with water.

The yield of the amination reaction was 86% (mole of N-methylglucamine per mole of chloromethylstyrene).

The number of amine milliequivalents per g of film was 1.5. It can be seen that the yield is also very good.

Table II below shows the whole of the results obtained with the new amination method.

TABLE II

| Code no | Initial mixture | Irradiation time (at 16.5 rad/min) | Chloromethylstyrene content of the membrane (%) | Amine used | Yield in moles of amine/moles of chloromethylstyrene | Number of meq of amine/g of dry film |
|---|---|---|---|---|---|---|
| 19'6$^3$ | 90 chloromethylstyrene 10 benzene | 164 h | 37.1 | pure diethylamine | 98.5% | 2.03 |
| 19'5$^1$ | 90 chloromethylstyrene | 163 h 39 min | 37.1 | methylamine in a | 94.8% | 2.14 |

TABLE II-continued

| Code no | Initial mixture | Irradiation time (at 16.5 rad/min) | Chloromethylstyrene content of the membrane (%) | Amine used | Yield in moles of amine/moles of chloromethylstyrene | Number of meq of amine/g of dry film |
| --- | --- | --- | --- | --- | --- | --- |
| 19'$_6^1$ | 10 benzene<br>90 chloromethylstyrene<br>10 benzene | 164 h | 38.1 | 40% aqueous sol. pure N—methyl-glucamine | 86% | 1.5 |

It can be seen that amination reactions with primary and seconary amines are considerably improved if the new amination method is used.

With tertiary amines, the reaction works remarkably well as ambient temperature.

III. Determination of the transfer capacity of the membranes with respect to boric acid.

Conditioning the membrane

The membrane had to be balanced, it was subjected to two exchange cycles so as to stabilize its properties and to eliminate essentially the impurities which could come from manufacture:
- the membrane was immersed for one hour in a solution of 1N sodium hydroxide at the rate of 200 ml per gram of dehydrated membrane,
- the sample was rinsed in distilled water at the rate of a liter per gram of dehydrated membrane and the two faces of the sample were wiped with filter paper,
- the membrane was immersed for one hour in a solution of 1N hydrochloric acid at the rate of 200 ml per gram of dehydrated membrane,
- it was rinsed with a solution of 1M sodium chloride at the rate of 1 liter per gram of dehydrated membrane,
- the cycle was repeated twice.

BRIEF DESCRIPTION OF THE DRAWING

The experimental device is shown schematically in the single accompanying FIGURE.

Operating mode

The aminated membrane 1 is interposed between two aqueous phases A and B of equal volume (36 cm$^3$). The initial compositions are the following:

Medium A: boric acid, 550 ppm of bore+LiOH at 1 ppm lithium;

Medium B: pure water.

Two electrodes 2 and 3 in the form of a platinum grid are applied on each side of the membrane and connected to a stabilized supply 4 (device commercialized under the name Lambda Electronique LQ 534 W) operating as a DC current generator. The variations of current and voltage are measured by means of a recorder 5 and a voltmeter V. The direction of the electric current passing through the cell is such that compartment A is on the cathode side and compartment B on the anode side. Homogeneization of the two media is provided by glass agitators 6 and 7 actuated by small electric motors not shown. In each of the media, the temperature, measured by thermometers 8 and 9, is adjusted by means of probes 10 and 11 connected to heaters 12 and 13 through relays 14 and 15. During the 30 minutes which follow filling of the cell, no electric current passes through the membrane and thus the transfer of boric acid is ensured solely by the diffusion process. The area of the membrane is 20 cm$^2$.

At time t=30 minutes, a sample of 10 cm$^3$ is taken from compartment B and immediately afterwards an equal volume of pure water is added so that the same volume is maintained. A current of known intensity is immediatey applied and every ten minutes a sample is taken followed immediately by the addition of an equal volume of pure water. The quantity of boric acid is determined by pHmetry after addition of mannitol.

Working with a 10% trimethylamine membrane at a constant temperature of 45° C., it was found that after 20 minutes all the boric acid originally contained in compartment A (1,67.10$^{-3}$ mole) had gone into compartment B.

I=455 mA; "Farraday yield": 21%

With a 16 % trimethylamine membrane, a total transfer of boric acid (1,67.10$^{-3}$ mole) U=122 V) was also obtained in 20 minutes; Farraday yield: 50%.

It should be noted that the grid electrodes may be advantageously replaced by solid porous but conducting electrodes made for example from sintered carbon.

IV. Studying the boron flow by electrodialysis

1. Apparatus used:

The measuring cell was formed from two sealed compartments between which was situted an anionic membrane usable in accordance with the invention. Two platinum grid electrodes of circular shape were applied against the membrane so as to reduce the ohmic drop. The diameter of each electrode was 5 cm which corresponds to an exchange area of about 20 cm$^2$.

2. Preparation of the cell:

In each compartment of the cell, the electrode was applied against the surface of the membrane.

The membrane to be studied was inserted between the two blocks of the cell which were held strongly clamped together during the whole experiment so as to avoid any leak.

The cathode compartment contained 40 ml of boric acid at a concentration of 500 ppm expressed as boron, i.e. 1.85×10$^{-3}$ mole of boron, whereas, in the anode compartment, there was placed 40 ml of water.

Two stirrers driven at a constant speed by two electric motors ensured homogeneization of the solution in the two compartments of the cell.

First type of experiment:

The cathode compartment contained, in addition to boric acid, 1 ppm of lithine.

The temperature was kept at 45° C.

The membrane was previously conditioned in the form BO$_2^-$ and a diffusion step took place before working under an electric current so as to finish the conditioning.

There was not circulation in the compartments. The anode compartment contained pure water.

(a) With a "mixed" 49% trimethylamine (TMA) and 47% diethylamine (DEA) membrane.

I=200 mA (10 mA/cm$^2$). 332 ppm of boric acid passed in 1 hour.

(b) with a "mixed" 83% TMA and 16% DEA membrane. I=100 mA (5 mA/cm$^2$). 412 ppm of boron were eliminated in 1 hour.

(c) with a 10% TMA membrane.

I=500 mA. At the end of 25 minutes, the 500 ppm were eliminated.

Second type of experiment:

In the cathode compartment flowed an aqueous solution which contained 500 ppm of boric acid and 1 ppm of lithine.

The temperature was 45° C.; the current 500 mA (25 mA/cm$^2$).

The experiments lasted continuously for a hundred hours or so.

(a) use of a 16.6% TMA membrane reticulated with divinyl-benzene.

A constant purification yield of 60% was observed. i.e. 300 ppm eliminated continuously. Flow: 18 g/h/m$^2$ of membrane.

(b) use of a 40% TMA, non reticulated membrane.

The constant purification yield was 40%, i.e. 200 ppm eliminated continuously. Flow: 12 g/h/m$^2$ of membrane.

(c) use of a 36% TMA membrane. The constant purification yield was 60%, i.e. 300 ppm eliminated continuously. Flow: 18 g/h/m$^2$ of membrane.

Preparation of a reticulated membrane

EXAMPLE 11

A FEP membrane was grafted with a mixture 90/10 of chloromethylstyrene and benzene containing 3% in volume of divinylbenzene and 10$^{-6}$M pyrocatechol. The time of irradiation was 233 h 30 min. under an intensity of 16.5 rad. min$^{-1}$. The total dosis was 0.23Mrad. The water content of the obtained membrane, in presence of water, was 4,9 mM, whereas, without a reticulating compound, it was 8 mM. This example shows that reticulation improves the selectivity of the membranes for the contemplated application.

We claim:

1. A process for modifying the concentration of acid in a weakly ionized solution, and more particularly for extraction thereof from this solution, characterized in that it consists of simultaneously carrying out dissociation of the acid and electrodialysis of the solution using at least one electrodialysis membrane comprising a polymer support compatible with the solution and having aminated groups.

2. A process according to claim 1, characterized in that the polymer support is formed from a polyethylene, a polyester or a perfluorated polymer.

3. Process according to claim 1, charcterized in that the aminated groups result from the fixing on the support of a primary, secondary or tertiary amine comprising only alcoyl groups, preferably methyl or ethyl or a primary, secondary or tertiary amine having a complexing power with respect to the acid to be treated, preferably N-methylglucamine.

4. Process according to claim 3, characterized in that the aminated groups are fixed on the support by means of a process comprising grafting, more especially radio chemical grafting of a compound capable of being grafted on the chosen support, which compound comprises at least one halogenoalkylated, preferably chloromethylated group or alternately by grafting a compound not comprising such a group, with subsequent halogenoalkylation and reaction of the halogenoalkylated, preferably chloromethylated polymer obtained with the chosen amine.

5. Process according to claim 1, characterized in that the aminated groups result from grafting on the support of a compound comprising a pyridine or piperidine type function.

6. Process for modifying the concentration of boric acid in a weakly ionized solution, more particularly for extraction thereof, characterized in that it consists in simultaneously carrying out dissociation of the boric acid and electrodialysis of the solution using at least one electrodialysis membrane comprising a support with a perfluorated base, preferably with a PTFE or FEP basis, and having aminated groups.

7. Process according to claim 6, characterized in that the electrodes are applied against the membrane, on each side thereof.

8. Process according to claim 6, characterized in that the aminated groups result from the fixing on the support of a primary, secondary or tertiary amine only comprising alkyl groups, preferably methyl or ethyl, or a primary, secondary or tertiary amine having at least one group with a complexing power with respect to the acid to be treated, preferably N-methylglucamine.

9. Process according to claim 6, characterized in that the aminated groups are fixed on the support by means of a process comprising grafting, more especially radio chemical grafting of a compound capable of being grafted on the chosen support, which compound comprises at least one halogenoalkylated, preferably chloromethylated, group, or alternately by grafting a compound not having such a group, with subsequent halogenoalkylation and by reacting the halogenoalkoylated, preferably chloromethylated, polymer obtained with the chosen amine.

10. Process according to claim 6, characterized in that the aminated groups result from the grafting on the support of a compound having a pyridine or piperidine type function.

11. Process according to claim 6, characterized in that the membrane is reticulated by a bifunctional compound, preferably divinyl-benzene or a methacrylate.

* * * * *